(12) United States Patent
Ham et al.

(10) Patent No.: US 6,570,336 B2
(45) Date of Patent: May 27, 2003

(54) DISPLAY WITH MICRO LIGHT MODULATOR

(75) Inventors: Yong Sung Ham, Kyonggi-do (KR); Hyung Ki Hong, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/893,773

(22) Filed: Jun. 29, 2001

(65) Prior Publication Data

US 2002/0047564 A1 Apr. 25, 2002

(30) Foreign Application Priority Data

Jul. 25, 2000 (KR) .................................. 2000-42849

(51) Int. Cl.$^7$ .................................................. G09G 3/10
(52) U.S. Cl. .................................. 315/169.3; 315/169.4
(58) Field of Search ..................... 315/169.3, 169.4, 315/169.1; 313/125, 146, 265, 293, 383, 390, 417, 444, 449

(56) References Cited

U.S. PATENT DOCUMENTS

| | | | | |
|---|---|---|---|---|
| 4,923,283 A | * | 5/1990 | Verhulst et al. | 345/85 |
| 5,895,851 A | * | 4/1999 | Kano et al. | 73/1.37 |
| 5,905,241 A | * | 5/1999 | Park et al. | 200/408 |
| 5,998,906 A | * | 12/1999 | Jerman et al. | 310/309 |
| 6,065,341 A | * | 5/2000 | Ishio et al. | 361/283.3 |
| 6,201,284 B1 | * | 3/2001 | Hirata et al. | 257/415 |
| 6,424,504 B1 | * | 7/2002 | Abe et al. | 360/294.3 |

* cited by examiner

*Primary Examiner*—Don Wong
*Assistant Examiner*—Trinh Vo Dinh
(74) *Attorney, Agent, or Firm*—Morgan, Lewis & Bockius LLP

(57) ABSTRACT

A display with a micro light modulators including a transparent substrate, a plurality of fixed electrodes on the substrate, a plurality of movable electrodes over and between the fixed electrodes, each movable electrode having a size different from one another and overlapping portions of adjacent fixed electrodes, and a back light on a back surface of the substrate.

19 Claims, 12 Drawing Sheets

$V_{th}(L1)$ $V_{th}(L2)$ $V_{th}(L3)$

⋮

$V_{th}(Ln)$

DISPLAY WITH MICRO LIGHT MODULATOR

The present invention claims the benefit of Korean Patent Application No. P2000-42849 filed in Korea on Jul. 25, 2000, which is hereby incorporated by reference.

BACKGROUND OF THE INVENTION

1. Field of the Invention

The present invention relates to displays, and more particularly, to a display with micro light modulators in which light is modulated for displaying a picture.

2. Background of the Related Art

For the next generation of display, there has been active research on different types of Flat Panel Displays (FPDs). The most popular displays of this research have been the Liquid Crystal Display (LCD) that employs the electro-optical properties of liquid crystal and the Plasma Display Panel (PDP) that employs plasma induced by electron discharge.

The LCD not only has the drawbacks of a narrow viewing angle and a slow response to video signals, but also has a complicated fabrication process since the Thin Film Transistors (TFTs) and electrodes used in a LCD are formed using semiconductor fabrication processes. Although the PDP has an advantage of a simple fabrication process that is desirable for manufacturing large sized displays, the PDP has the drawbacks of a high power consumption, low luminance due to poor discharge efficiency and relatively high cost.

There has been a development of a new display that solves the foregoing problems in flat panel displays. The new display uses a micro light modulator having Micro Electro-mechanical Systems (MEMS), an extra hyperfine machining technology, in every pixel for displaying a picture.

A related art display with a micro light modulator will be explained with reference to the attached drawings. FIG. 1 illustrates a plan view of a representative related art display with micro light modulator.

Referring to FIG. 1, the related art display with micro light modulator is provided with a plurality of fixed electrodes 13 formed in parallel at fixed intervals on a substrate 11, a plurality of movable electrodes 15 formed in parallel at fixed intervals over, between and in the same direction as the fixed electrodes 13. The ends of the movable electrodes 15 extend outward more than the ends of the fixed electrodes 13, and the sides of the movable electrodes 15 respectively overlap adjacent fixed electrodes 13 of the display.

When no voltage is applied between the fixed electrode 13 and the movable electrode 15, the movable electrode 15 is separated by a distance from the fixed electrode, and thus light from back light (not shown) under a substrate 11 is transmitted through to a display surface above the movable electrode. When a voltage is applied between the fixed electrode 13 and the movable electrode 15, the movable electrode 15 is brought into contact with the fixed electrode 13, and thus no light is transmitted through.

FIGS. 2A and 2B illustrate cross sections along line A–A' in FIG. 1, wherein it can be seen that the fixed electrodes 13 are formed in parallel at fixed intervals on the substrate 11, and the movable electrodes 15 are formed so as to be overlapped with the fixed electrodes 13 on both sides thereof. The fixed electrodes 13 are formed as stripes on the substrate 11. Both ends of the movable electrodes 15 are affixed (not shown) to the substrate 11 and the central portion of the movable electrodes 15 is separated by a distance from the fixed electrodes 13. The central portion of the movable electrodes 15 is movable in up and down direction in response to an electrical signal applied between the movable electrodes 15 and the fixed electrodes 13.

FIG. 2A illustrates a cross section showing the electrodes of a representative portion of the display, e.g. a pixel in an off state. Initially, incident light from a back light 19 on a back side of the substrate 11 emanates through a space between the fixed electrodes 13 and the movable electrodes 15. A preset level of voltage applied between the fixed electrodes 13 and the movable electrodes 15 induces an attraction between the fixed electrode 13 and the movable electrode 15 through an electrostatic force. As result of the application of a preset voltage, the movable electrodes 15 come into contact with adjacent fixed electrodes 13 and thus, turns the pixel off by cutting off the incident light from a back light 19 on a back side of the substrate 11.

As shown in FIG. 2B, when no voltage is applied between the fixed electrodes 13 and the movable electrodes 15, the movable electrodes 15 are maintained at or restored to an original state by elastic force to being separated by a distance from the fixed electrodes 13. The distance between the fixed electrodes 13 and the movable electrode 15 enable incident light from the back light 19 to transmit so as to turn on the pixel. For reference, the elastic material layer 17 positioned under the movable electrodes 15 is used for the elastic force.

FIG. 2C illustrates a section along line B–B' in FIG. 1, wherein it can be seen that the ends of the movable electrodes 15 are formed on the substrate 11 at fixed intervals. Since the related art display with a micro light modulator has movable electrodes 15 that all have the same width and length, all of the movable electrodes 15 will move simultaneously at the same driving voltage level. The relationship of transmissivity through the related art micro light modulator and driving voltage V between the fixed electrodes 13 and the movable electrodes 15 is illustrated in FIG. 3. The driving voltage at which there is no transmissivity through a micro light modulator is known as the threshold voltage.

Referring to FIG. 3, since the related art micro light modulator has essentially only two levels of transmissivity, it is required that the related art display be driven by a time-division driving circuit for implementing gray levels, in which timing for applying a voltage to a given pixel is constantly changed. Therefore, the related art requires additional driving circuitry, which makes the overall circuitry for the display complicated.

SUMMARY OF THE INVENTION

Accordingly, the present invention is directed to a display with micro light modulators that substantially obviates one or more of the problems due to limitations and disadvantages of the related art.

An object of the present invention is to provide a display with micro light modulators, in which a micro light modulators is used for implementing a gray level without a separate driving circuit.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the display with micro light modulators includes a transparent substrate, a plurality of fixed electrodes on the substrate, a plurality of movable electrodes over and between the fixed electrodes, each movable electrode having a size different from one another and overlapping portions of adjacent fixed electrodes, and a back light on a back surface of the substrate.

In another aspect of the present invention, there is provided a display with a micro light modulator including a substrate, a plurality of fixed electrodes on the substrate, a plurality of movable electrodes each having first micro supports at both lengthwise ends and a second micro support at a location between the first micro supports, wherein each of the movable electrodes has a second micro support at a location different location from the other movable electrodes, and wherein each of the movable electrodes are formed over and between the fixed electrodes, and overlaps portions of adjacent fixed electrodes, and a back light on a back surface of the substrate.

In another aspect of the present invention, there is provided a display with a micro light modulator including a substrate, a plurality of fixed electrodes on the substrate, a plurality of movable electrodes each having at least one micro support, wherein each of the movable electrodes overlap with portions of adjacent ones of the fixed electrodes, an insulating material layer positioned under each of the movable electrodes; and a back light on a back surface of the substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENT

Reference will now be made in detail to the preferred embodiments of the present invention, examples of which are illustrated in the accompanying drawings.

Figure 1:
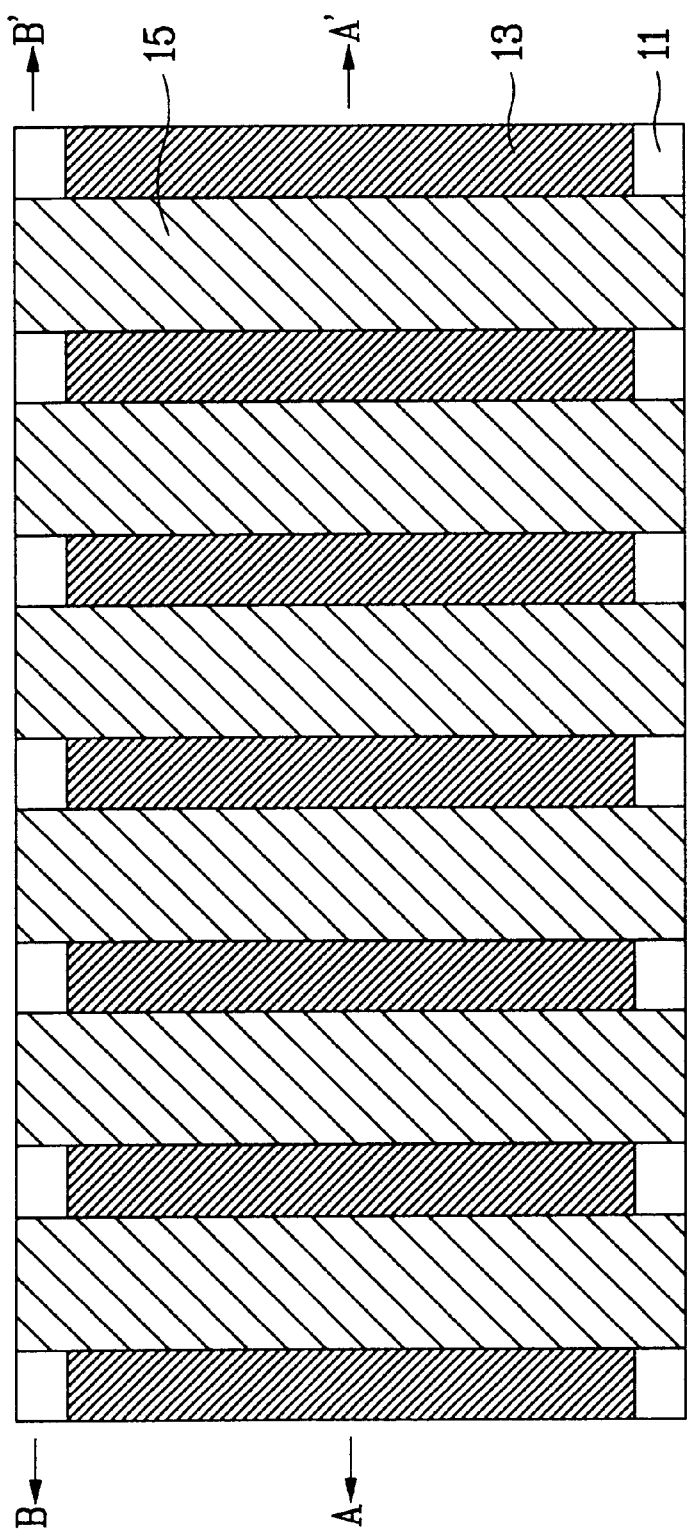
FIG. 1 illustrates a plan view of a representative portion of related art display with micro light modulators.
Figure 2A:
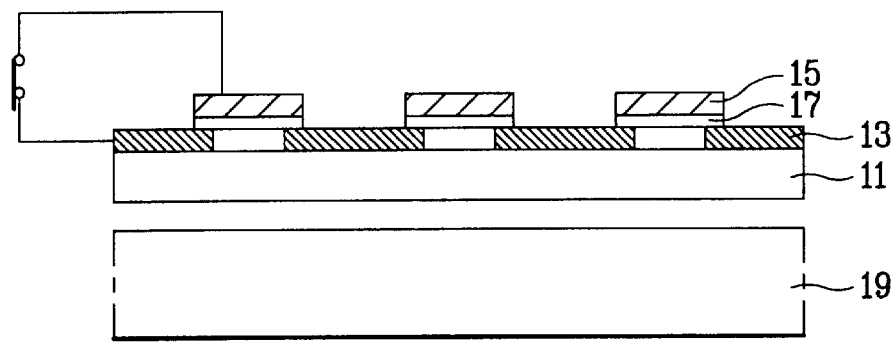
FIGS. 2A and 2B illustrate cross sections along line A–A' in FIG. 1.
Figure 2B:
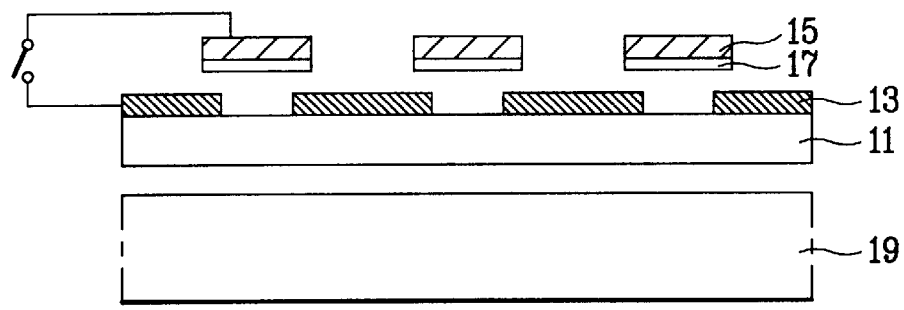
Figure 2C:
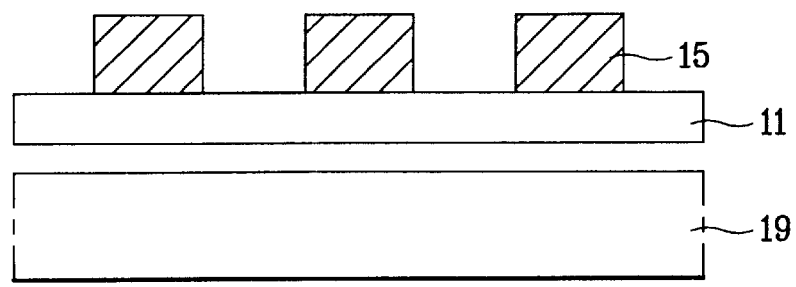
FIG. 2C illustrates a cross section along line B–B' in FIG. 1.
Figure 3:
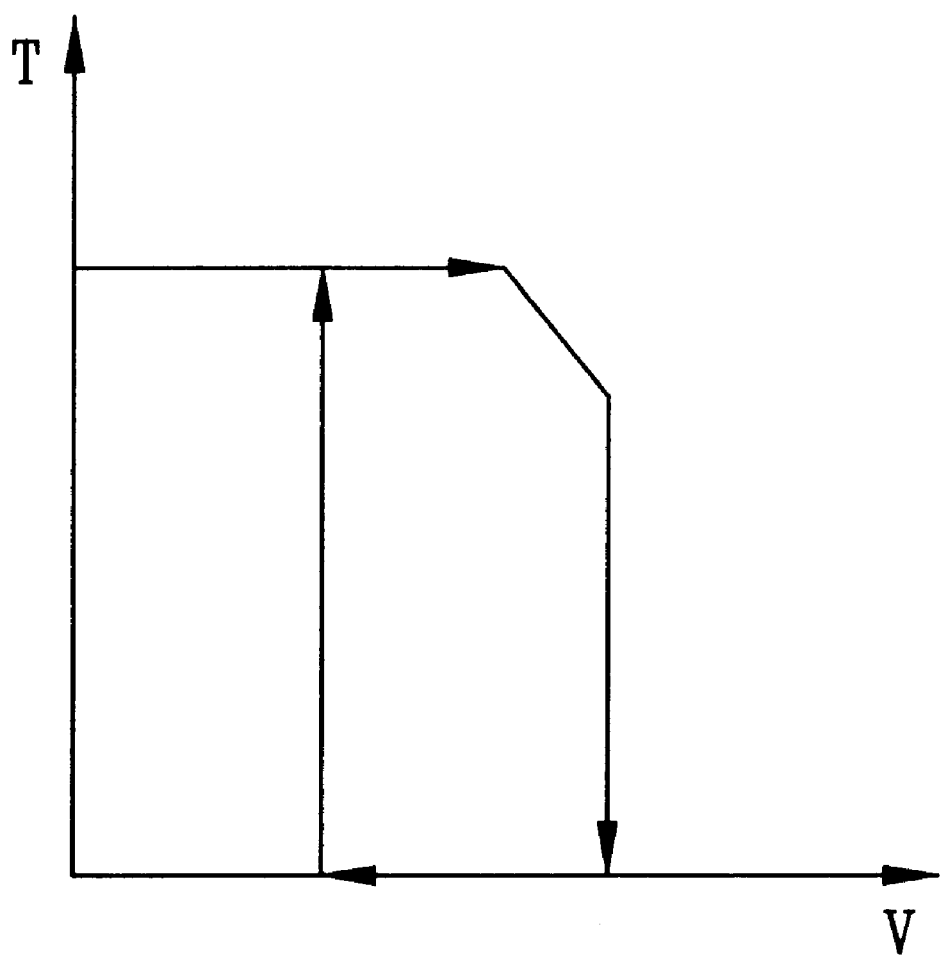
FIG. 3 illustrates the relationship between transmissivity and driving voltage in the related art micro light modulators.
Figure 4:
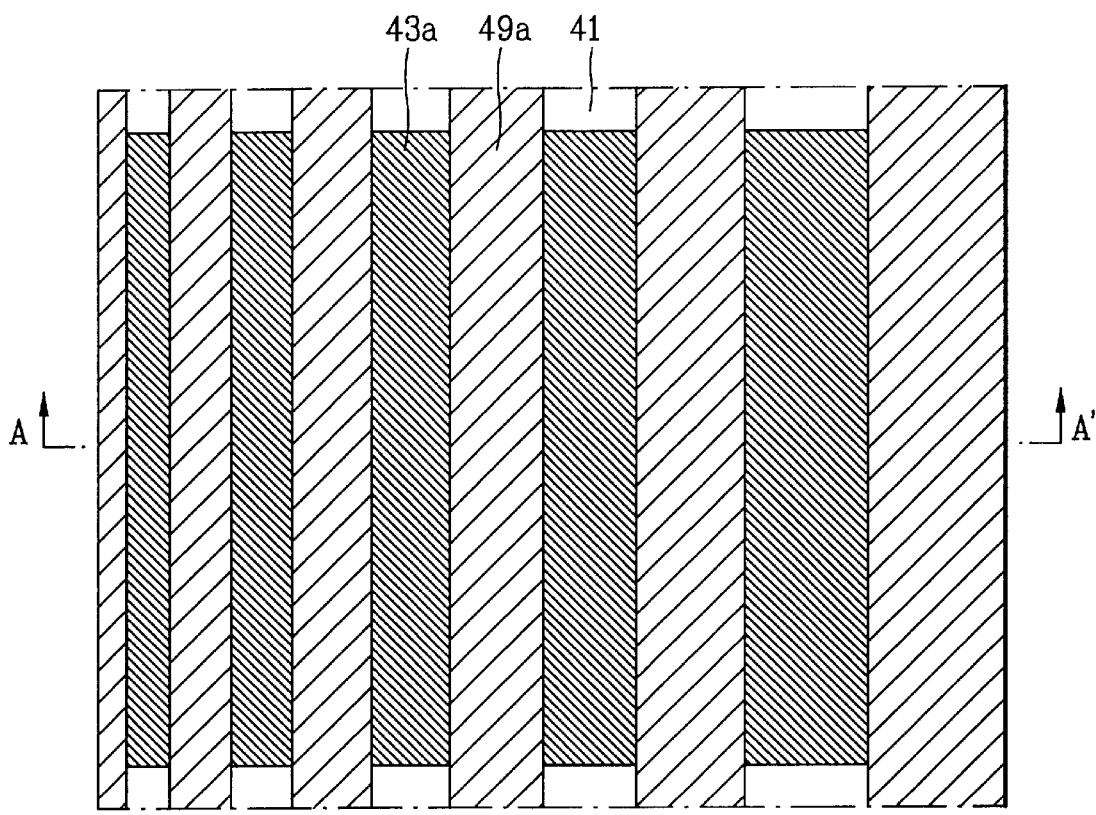
FIG. 4 illustrates a plan view of a representative portion, e.g. a pixel, of a display with micro light modulator in accordance with a first embodiment of the present invention.
Figure 5:
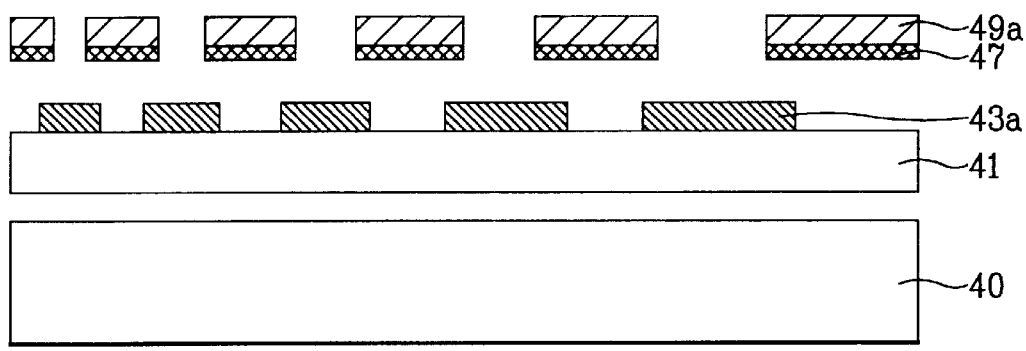
FIG. 5 illustrates a cross section along a line A–A' in FIG. 4.

FIG. 4 illustrates a plan view of a representative portion, e.g. a pixel, of a display with micro light modulator in accordance with a first embodiment of the present invention, and FIG. 5 illustrates a cross section along line A–A' in FIG. 4.

Referring to FIG. 4, the display with micro light modulator in accordance with the first embodiment of the present invention includes a transparent substrate 41, a plurality of fixed electrodes 43a formed in parallel to one another on the substrate 41 and each having a different width than other fixed electrodes, a plurality of movable electrodes 49a each formed above, overlapping and between adjacent fixed electrodes 43a, and wherein each movable electrodes 49a has a different width than other movable electrodes 49a.

As shown in FIG. 4, the widths of the fixed electrodes 43a and the movable electrodes 49a change gradually in succession from one side of the pixel to the other. In the alternative, only widths of the movable electrodes 49a may change gradually in succession from one side of the pixel to the other while the widths of the fixed electrodes 43a are all the same.

Both ends of the movable electrodes 49a are attached to the substrate 41 (not shown) and the central portions are separated from the fixed electrodes 43a by a space to form a microbridge, as shown in FIG. 5. An insulating elastic material layer 47 is positioned under the movable electrode 49a to electrically insulate the movable electrode 49a from the substrate 41 and from the fixed electrodes 43a. A back light 40 on a back side of the substrate 41 emanates light through a space between the fixed electrodes 43a and the movable electrode 49a.

As illustrated in FIG. 5, the widths of both the fixed electrodes 43a and the movable electrodes 49a become gradually wider across the pixel. As a result, the threshold voltage for moving the movable electrodes 49a up and down is different for each movable electrode 49a because the threshold voltage for each the movable electrodes 49a is proportional to the width of the movable electrode 49. Therefore, the number of light modulation levels is set according to the number of movable electrodes 49a that have different widths.

Figure 6:
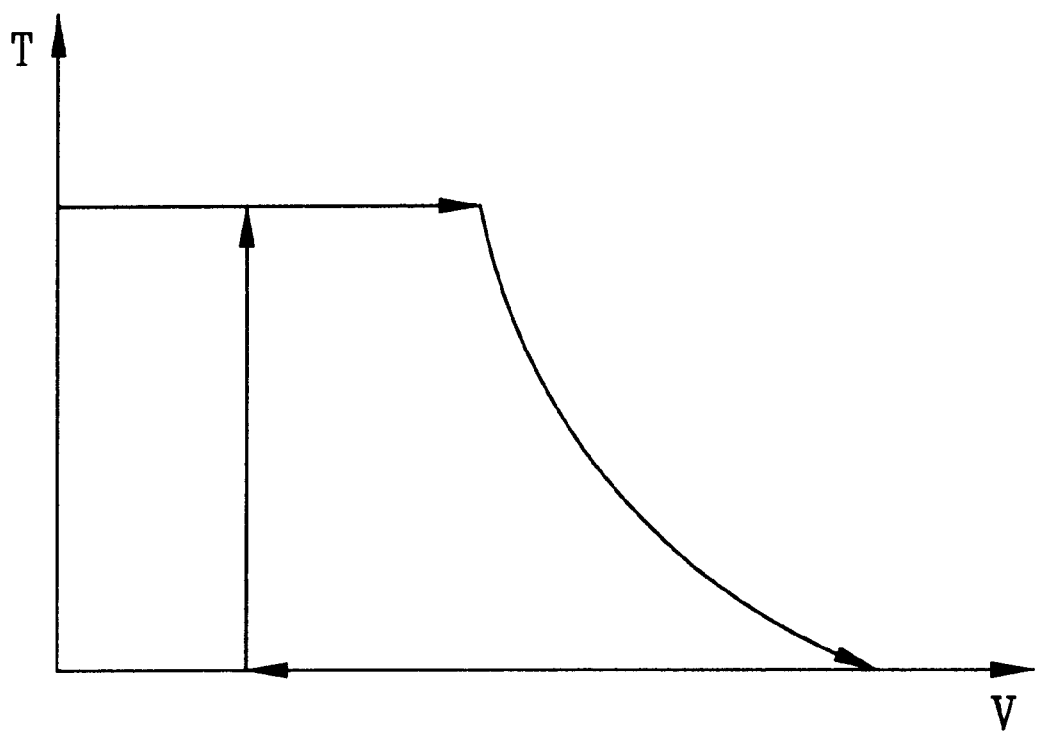
FIG. 6 illustrates the relationship between transmissivity and driving voltage 'V' of the present invention.

The relationship between transmissivity and driving voltage are shown in FIG. 6. Referring to FIG. 6, a threshold voltage for driving an electrode is low if the width of the corresponding electrodes is small, and the threshold voltage for driving an electrode is high if the width of the corresponding electrodes is large. Therefore, if a panel of pixels is driven within a voltage range between the threshold voltage of the electrode with the narrowest width and the threshold voltage of the electrode with the widest width, a number of gray levels at least equaling the number of electrodes having different widths can be implemented.

FIGS. 7A–7D illustrate cross sections for showing the steps in a method of fabricating a display with micro light modulator in accordance with the first embodiment of the present invention.

Figure 7A:
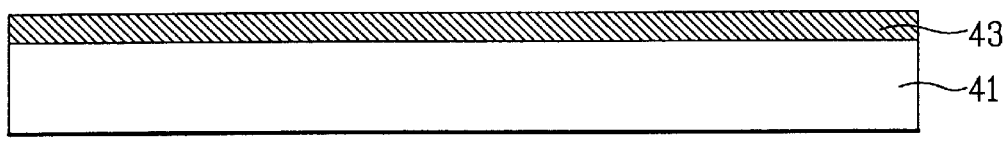
FIGS. 7A–7D illustrate cross sections along A–A' of FIG. 4 for showing the steps in a method of fabricating a display with micro light modulators in accordance with a first preferred embodiment of the present invention.
Figure 7B:
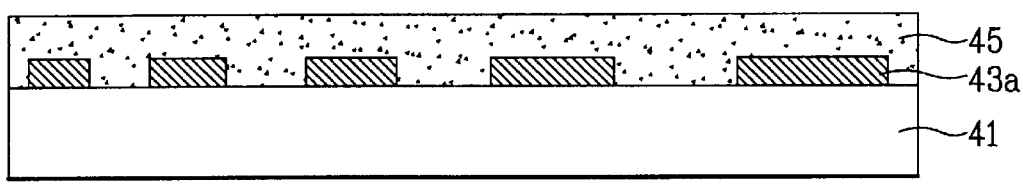

Referring to FIG. 7A, a first conductive material layer 43 is formed on a transparent substrate 41 and patterned by photo etching to form a plurality of parallel fixed electrodes 43a having gradually increasing widths from one side of the pixel to the other side of the pixel, as shown in FIG. 7B. A sacrificial layer 45 is formed on an entire surface of the substrate 41 and on the fixed electrode 43a. The sacrificial layer 45 is formed of a material that is to be removed later, such as silicon oxide film (SiO2), photoresist, Spin On Glass (SOG), Polyimide, Phosphorus Silicate Glass (PSG) or Boro Phosphorus Silicate Glass (BPSG).

Figure 7C:
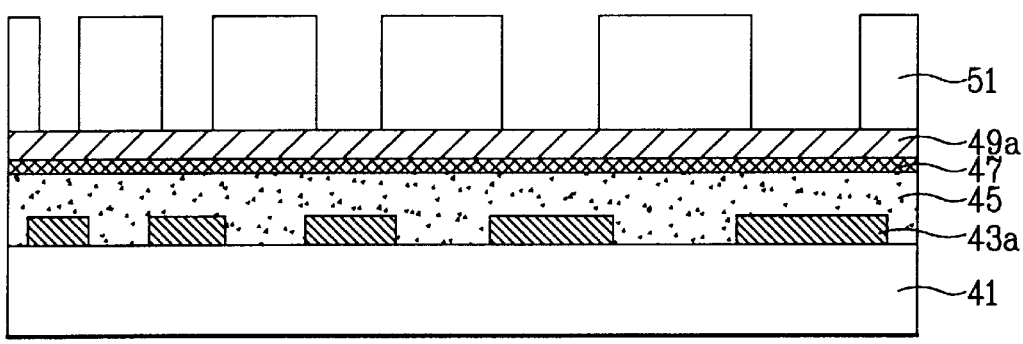
Figure 7D:
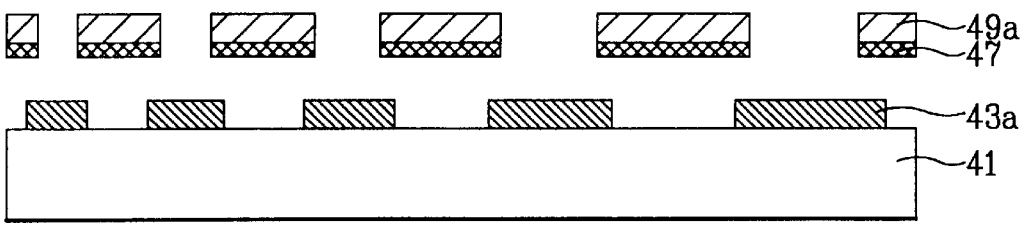

Then, as shown in FIG. 7C, an insulating elastic material layer 47 is formed on the sacrificial layer 45, and a second conductive material layer 49 is formed on the elastic material layer 47 in succession. A photoresist layer 51 is coated on the second conductive material layer 49, subjected to patterning by exposure and development, and then the second conductive material layer 49 and the elastic material layer 47 are selectively etched using the patterned photoresist layer 51 as a mask to form a plurality of movable electrodes 49a with widths that gradually change, as shown in FIG. 7D. The sacrificial layer 45 is then removed to complete formation of the display with micro light modulator in accordance with a first preferred embodiment of the present invention. In addition, a color filter (not shown) can be positioned over the movable electrodes 49a for a color display. Of course, a collection of pixels in a matrix array together with a back light will form a flat panel display.

Although not shown, both lengthwise ends of the movable electrodes 49a are attached to the substrate 41 with the elastic material 47 to form the movable electrodes 49a as microbridges.

Figure 8:
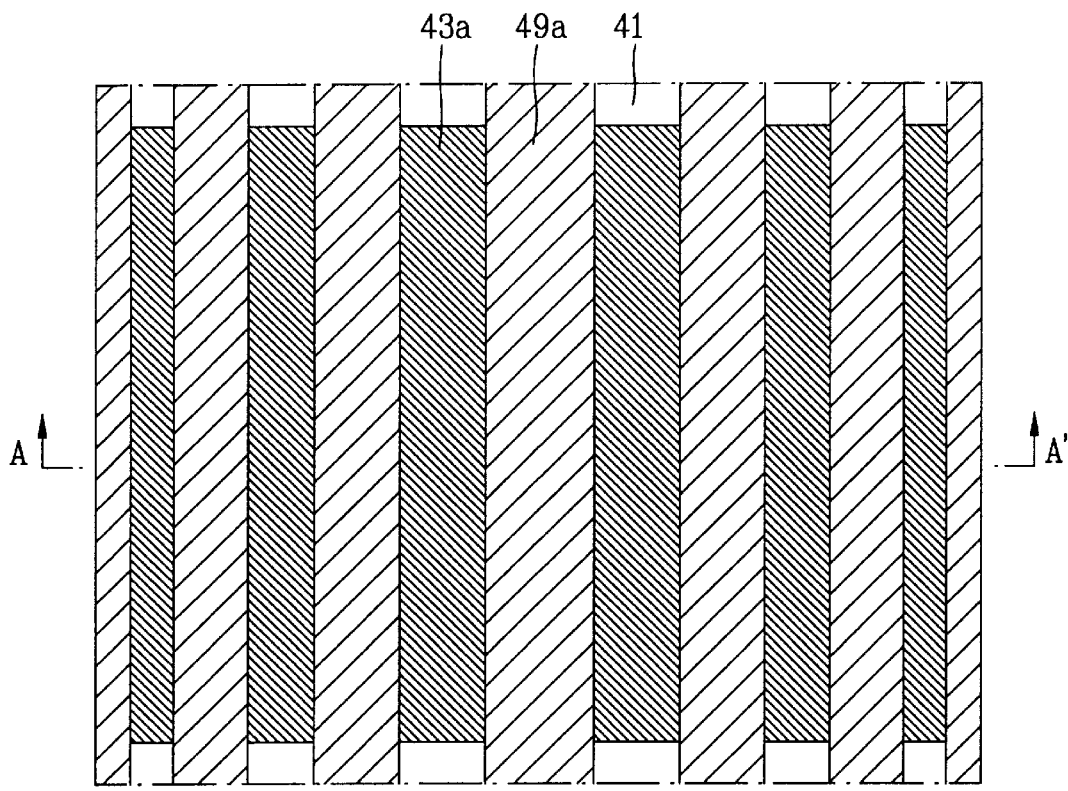
FIG. 8 illustrates a plan view of a representative portion, e.g. a pixel, of a display with micro light modulator in accordance with a second embodiment of the present invention.
Figure 9:
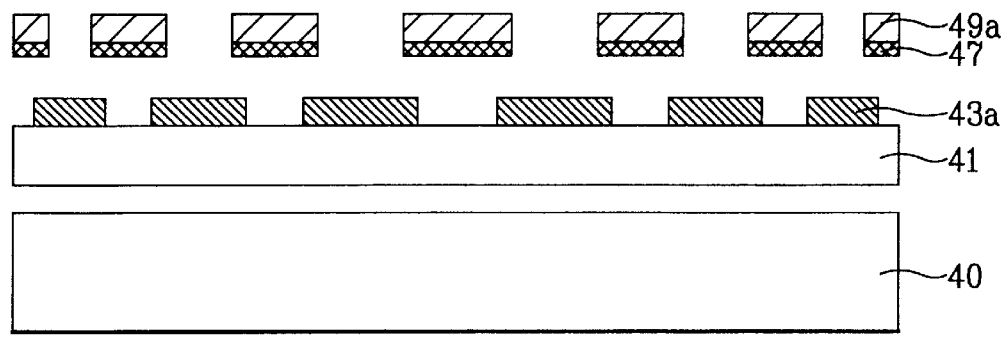
FIG. 9 illustrates a cross section along line A–A'.

FIG. 8 illustrates a plan view of a representative portion, e.g. a pixel, of a display with micro light modulator in accordance with a second embodiment of the present invention, and FIG. 9 illustrates a cross section along a line A–A'. The second embodiment of the present invention also includes movable electrodes with movable electrodes, but not in a fashion in which widths of the movable electrodes are increased from left to right or right to left within a given pixel as in the first embodiment. Instead, the widths of the movable electrodes increase toward the center of the pixel and decrease toward the sides of the pixel. Of course, opposite to this, widths of the movable electrodes 49a may increase toward the sides of the pixel from a center part of the pixel. Widths of the fixed electrodes 43a may change in proportion to the movable electrodes 49a, or be fixed without any variation.

As shown in FIGS. 8 and 9, since the threshold voltages may be set in a variety of fashions according to the variation of the widths of the electrodes, a variety of gray levels can be implemented without providing a separate driving circuit.

Figure 10:
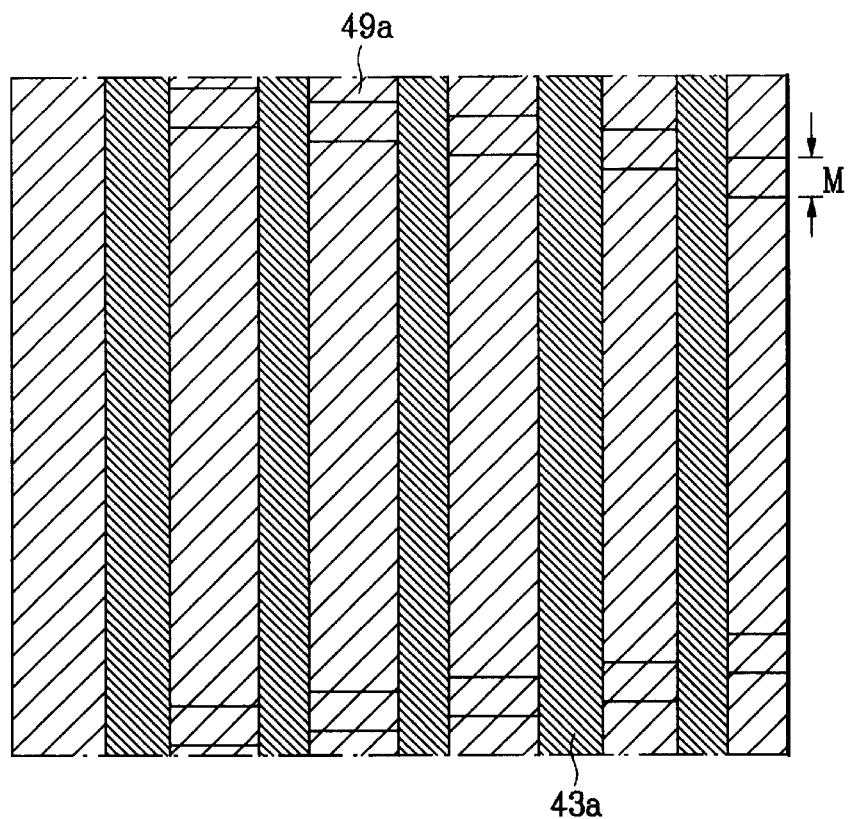
FIG. 10 illustrates a plan view of a representative portion, e.g. a pixel, of a display with micro light modulator in accordance with a third embodiment of the present invention.

FIG. 10 illustrates a plan view of a representative portion, e.g. a pixel, of a display with micro light modulator in accordance with a third embodiment of the present invention, in which lengths of the movable electrodes are changed to change threshold voltages of the electrodes for implementing gray levels by taking an average transmissivity of an entire area of the pixel into consideration.

Referring to FIG. 10, widths of movable electrodes 49a are fixed, while lengths of the movable electrodes 49a are gradually changed in succession across the pixel. That is, since a voltage to a given movable electrode 49a is dependent, not only on the width, but also on the length of the movable electrode 49a, the number of light modulation levels can be fixed by fixing a range of lengths of the movable electrodes 49a. Because there are two stable states of an 'ON' state and an 'OFF' state for each of the electrodes, if the length of the electrode is changed, the threshold voltage at which the ON/OFF state occurs is also changed. Therefore, an entire panel of pixels can be operated with a voltage range from the threshold voltage for the electrode of the shortest length to that for the electrode of the longest electrode. The number of light modulation levels can be set in a variety of fashions according to a the number of electrodes having different lengths.

Figure 11:
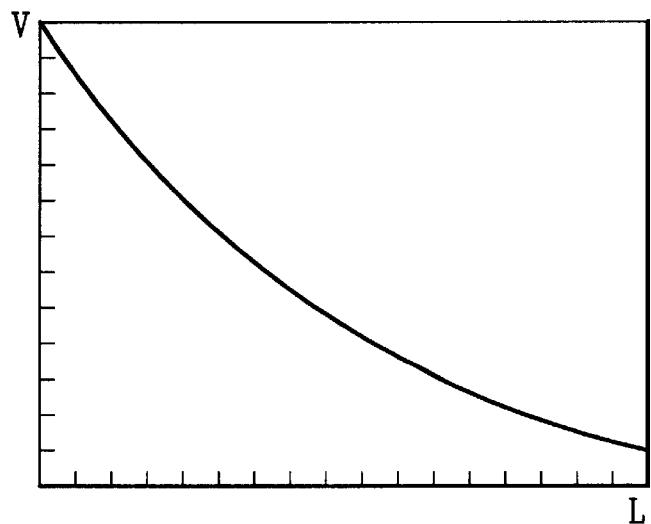
FIG. 11 illustrates a graph showing the relationship between of a the driving voltage and a length of electrode in accordance with a third embodiment of the present invention.

The threshold voltage Vth and the length 'L' of the electrode have a relationship as shown in FIG 11. The shorter the length of the electrode, the higher the threshold voltage, and the longer the length of the electrode, the lower the threshold voltage. Therefore, if an average transmissivity for an entire area of the pixels are taken into consideration, gray levels can be implemented as many as a number of electrodes within a voltage range from a threshold voltage for the longest electrode to the threshold voltage for the shortest electrode. For reference, "M" in FIG. 11 denotes supports that define the length of the movable electrodes 49a as micro bridge.

Figure 12:
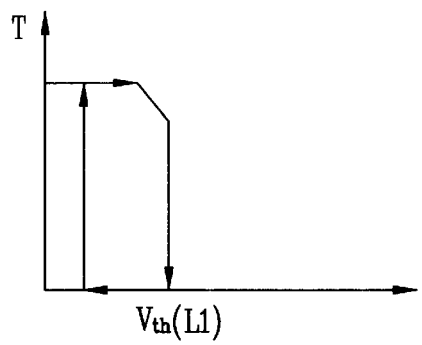
FIG. 12 illustrates a graph showing the relationship between transmissivity and the threshold driving voltage Vth(L) according to a length of electrode in accordance with a third embodiment of the present invention.
Figure 12:
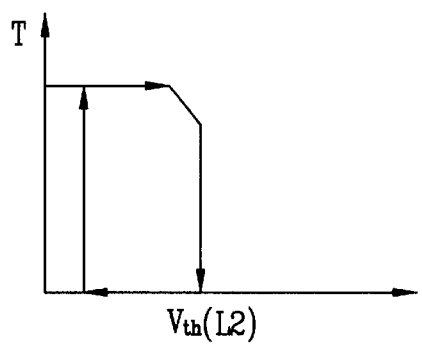
Figure 12:
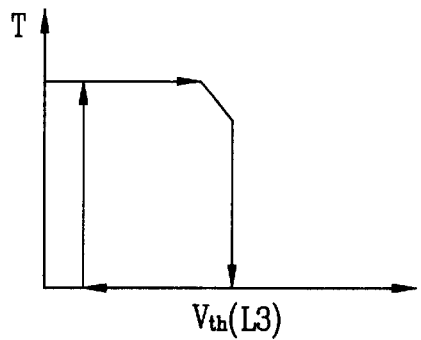
Figure 12:
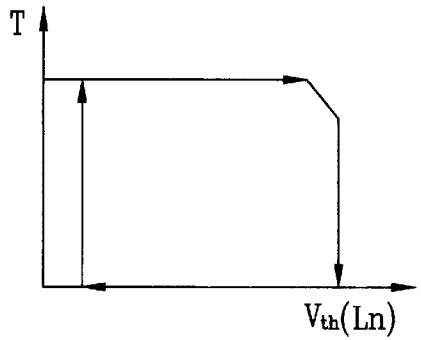

FIG. 12 illustrates a graph showing the relationship between transmissivity "T" and driving voltage Vth(L) according to a length of electrode in accordance with a third embodiment of the present invention. The transmissivity vs. threshold graphs for the longest electrode L1 down to the shortest electrode Ln are shown. As shown in FIG. 12, the change in threshold voltages depends on the lengths of the electrodes as micro bridges. As shown in FIG. 11, the lengths of the fixed electrodes 43a may not necessarily change and are not dependent on the lengths of the movable electrodes 49a. In the alternative, the fixed electrodes may be the same lengths as the movable electrodes.

Figure 13:
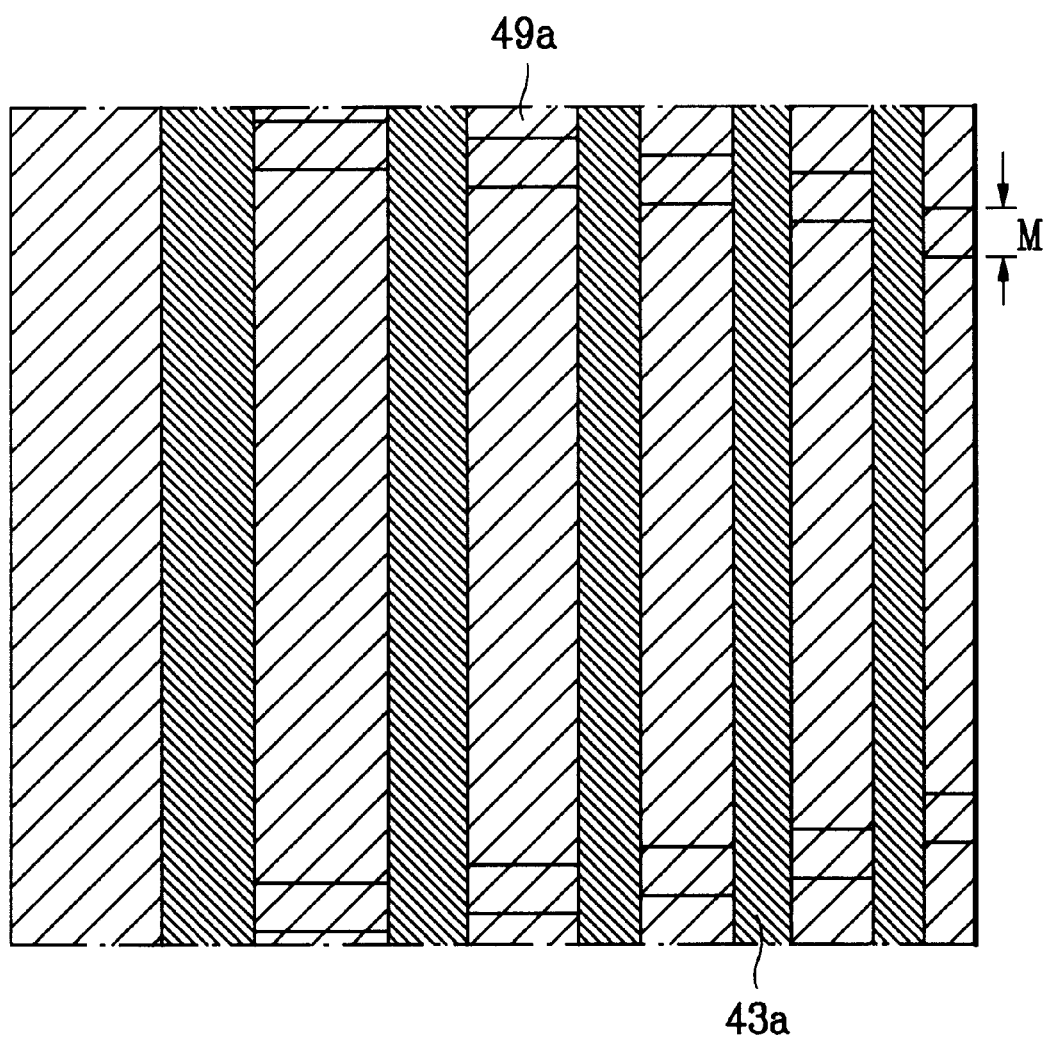
FIG. 13 illustrates a plan view of a representative portion, e.g. a pixel, of a display with micro light modulator in accordance with a fourth embodiment of the present invention.

Both the gradual variation of the lengths of the movable electrodes and the variation of widths of the movable electrodes are possible. As shown in FIG. 13, by setting the widths and lengths of the electrodes to gradually change in succession, the threshold voltages can be set to move the movable electrodes 49a up and down to provide a predetermined number of gray levels with a predetermined voltage range.

Figure 14:
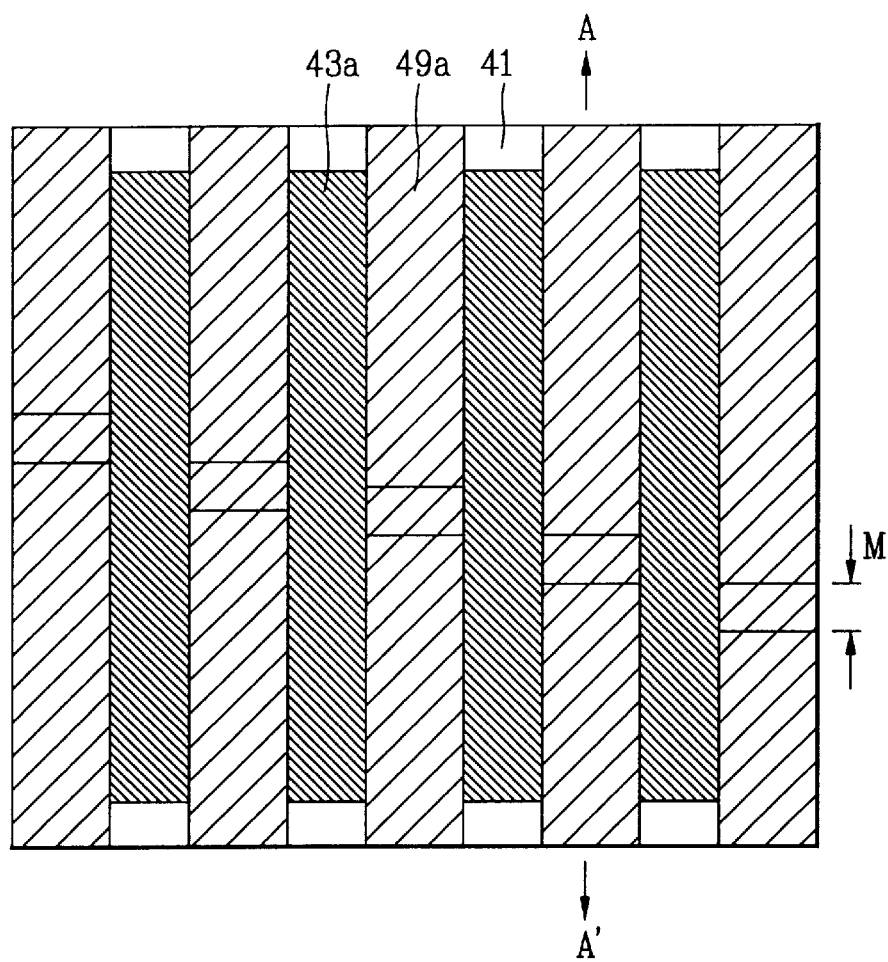
FIG. 14 illustrates a plan view of a representative portion, e.g. a pixel, of a display with micro light modulator in accordance with a fifth embodiment of the present invention.
Figure 15:
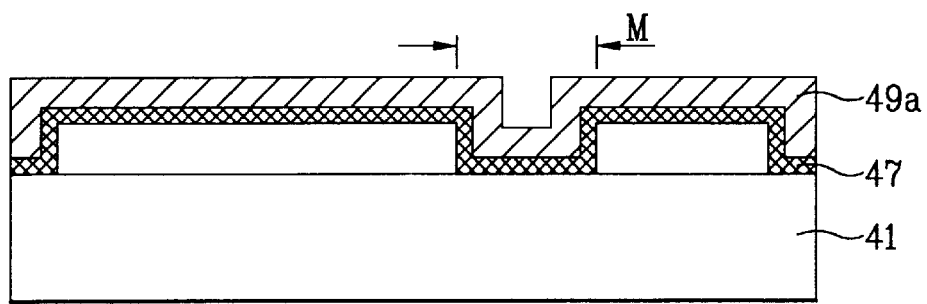
FIG. 15 illustrates a cross section along line A–A' in FIG. 14.

FIG. 14 illustrates a plan view of a representative portion, e.g. a pixel, of a display with micro light modulator in accordance with a fifth embodiment of the present invention, and FIG. 15 illustrates a cross section along a line A–A' in FIG. 14. Micro supports are formed in the middle of the movable electrodes 49a to set a range of a threshold voltages based upon the length of the two micro bridges on each side of the middle micro support in the movable electrode. That is, referring to FIGS. 14 and 15, the micro supports are formed at places defined by "M" in each of the movable electrodes 49a, thus setting different threshold voltages within each movable electrode 49a by using a different micro bridge lengths on both sides of a micro support within the movable electrode 49a.

A method for fabricating a display with micro light modulator in accordance with a fifth embodiment of the present invention will be explained with reference to FIGS. 16A–16D. FIGS. 16A–16D are cross sections along line A–A' in FIG. 14.

Figure 16A:
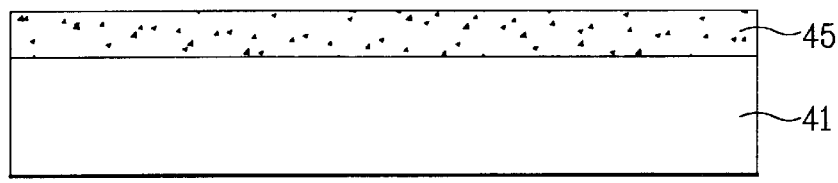
FIGS. 16A–16D illustrate cross sections for showing the steps of a method for fabricating a display with micro light modulator in accordance with a fifth embodiment of the present invention.

Referring to FIG. 16A, a first conductive material layer is formed on a transparent substrate 41, and then subjected to patterning by photo etching to form a plurality of fixed electrodes (not shown). In this instance, the widths of the fixed electrodes may or may not be equal to one another. Then, a sacrificial layer 45 is formed on an entire surface of the substrate 41 and on the fixed electrodes. The sacrificial layer 45 is in general a silicon oxide $SiO_2$ film, photoresist, SOG, polyimide, PSG, BPSG, or the like.

Figure 16B:
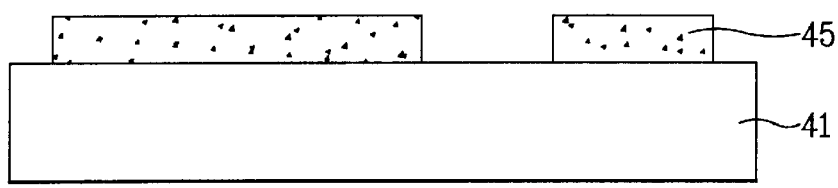

Then, as shown in FIG. 16B, the sacrificial layer 45 is selectively removed from a region where the micro supports are to be formed, to expose the substrate 41. In the fifth embodiment of the present invention, the micro supports are provided, not only at both ends of the movable electrode, but also at another location along the movable electrode. For convenience of description, the micro supports formed at both ends of the movable electrode are called first micro supports, and the micro supports formed at another location along a movable electrode is called a second micro support.

Figure 16C:
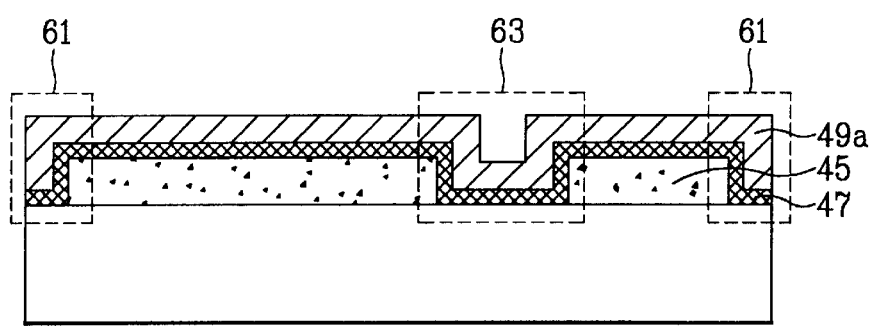

As shown in FIG. 16C, an insulating elastic material layer 47 is formed on the substrate 41 and on the sacrificial layer 43, and then a conductive material 49a is deposited thereon. Then, the conductive material layer 49a and the elastic material layer 47 are patterned by photo etching, or the like, to selectively remove the conductive material layer and the elastic material layer 47 and form a plurality of movable electrodes 49a.

As shown in FIG. 16C, the first micro supports 61 are formed at both ends of the substrate 41 and a second micro support 63 is formed between the first micro supports 61. The second micro support 63 may be formed closer to any one of the sides from of the movable electrode 49a. Therefore, the movable electrode 49a, or micro bridges, on both sides of the second micro support 63 may have different lengths. Therefore, the threshold voltages for moving the two sides of the movable electrode up and down may differ. The locations of the second micro support 63 is different for each movable electrodes 49a.

Figure 16D:
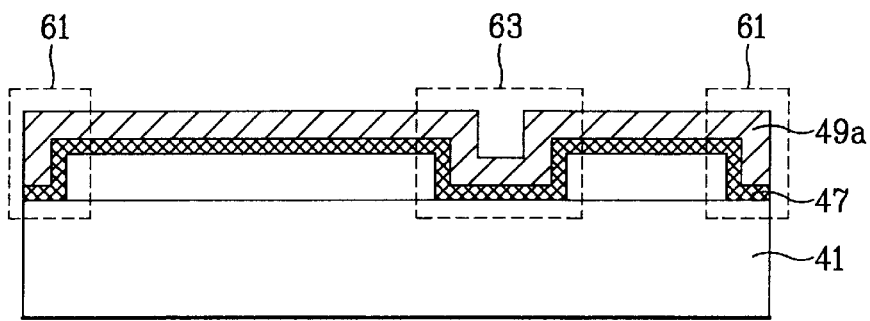

As shown in FIG. 16D, after the first and second micro supports 61 and 63 are formed, the sacrificial layer 45 is removed, and the fabrication of the fifth embodiment device with micro light modulator of the present invention can be completed.

Thus, by forming the first micro bridges 61 at both lengthwise ends of each movable electrode 49a and the second micro bridge 63 at another location along each of the movable electrodes 49a different from one movable electrode to another, gray levels can be implemented without separate driving circuit because a range of light modulation levels can be set by means of the differences of lengths of the movable electrodes.

As has been explained, the display with micro light modulators of the present invention permits a variety of light modulation levels by changing widths and lengths of the movable electrodes, which changes the threshold voltages of the movable electrodes, thereby implementing gray levels without a separate driving circuit.

It will be apparent to those skilled in the art that various modifications and variations can be made in the device with micro light modulator of the present invention without departing from the spirit or scope of the invention. Thus, it is intended that the present invention cover the modifications and variations of this invention provided they come within the scope of the appended claims and their equivalents.

What is claimed is:

1. A display with a micro light modulator comprising:
   a transparent substrate;
   a plurality of fixed electrodes on the substrate;
   a plurality of movable electrodes over and between the fixed electrodes, each movable electrode having a size different from one another and overlapping portions of adjacent fixed electrodes; and
   a back light on a back surface of the substrate.

2. The display of claim 1, wherein the plurality of movable electrodes have widths that gradually increase in one direction.

3. The display of claim 1, wherein the plurality of movable electrodes have lengths that gradually increase in one direction.

4. The display of claim 1, wherein the display has at least one pixel and the plurality of movable electrodes have different widths decreasing in width to both sides of a given pixel from a center of the pixel.

5. The display of claim 1, wherein the plurality of movable electrodes have widths and lengths that both that gradually increase in one direction.

6. The display of claim 1, wherein widths and lengths of the fixed electrodes are proportional to widths and lengths of the movable electrodes.

7. The display of claim 1, further comprising an elastic material layer positioned under each of the movable electrodes.

8. The display of claim 1, wherein the display has at least one pixel and the plurality of movable electrodes have different widths increasing in width to both sides of a given pixel from a center of a given pixel.

9. A display with a micro light modulator comprising:
   a substrate;
   a plurality of fixed electrodes on the substrate;
   a plurality of movable electrodes each having first micro supports at both lengthwise ends and a second micro support at a location between the first micro supports, wherein each of the movable electrodes has the second micro support at a different location along each of the movable electrodes and wherein each of the movable electrodes is formed over and between the fixed electrodes, and overlaps portions of adjacent fixed electrodes; and
   a back light on a back surface of the substrate.

10. The display of claim 9, wherein the plurality of movable electrodes have widths and lengths that gradually increase in one direction.

11. The display of claim 9, wherein the plurality of movable electrodes have widths that gradually increase in one direction.

12. The display of claim 9, wherein the plurality of movable electrodes have lengths that gradually increase in one direction.

13. The display of claim 9, further comprising an elastic material layer positioned under each of the movable electrodes.

14. A display with a micro light modulator comprising:
   a substrate;
   a plurality of fixed electrodes on the substrate;
   a plurality of movable electrodes each having at least one micro support, wherein each of the movable electrodes overlap with portions of adjacent ones of the fixed electrodes, and wherein widths and lengths of the fixed electrodes are respectively proportional to widths and lengths of the movable electrodes;
   an insulating material layer positioned under each of the movable electrodes; and a back light on a back surface of the substrate.

15. The display of claim 14, wherein the plurality of movable electrodes have widths that increase in one direction.

16. The display of claim 14, wherein the plurality of movable electrodes have lengths that increase in one direction.

17. The display of claim 16, wherein the plurality of movable electrodes each has micro supports at both lengthwise ends thereof and a second micro support at a location between the first micro supports and wherein the location of the second micro support is different in each of the movable electrodes.

18. The display of claim 14, wherein the plurality of movable electrodes each either decreases or increases in width to both sides from a center movable electrode.

19. The display of claim 14, wherein the plurality of movable electrodes have widths that gradually increase in one direction.

* * * * *